United States Patent Office 2,707,366
Patented May 3, 1955

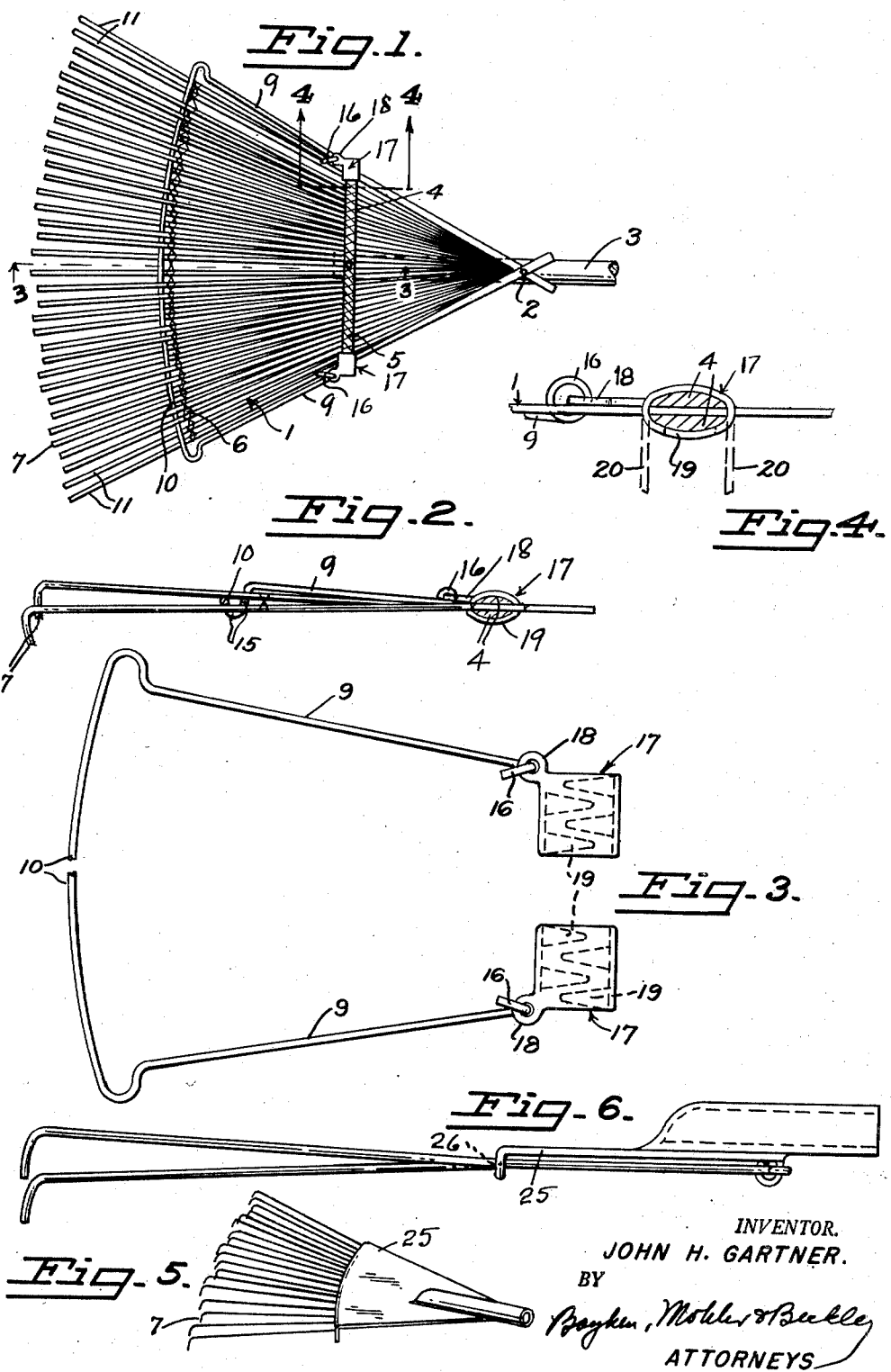

2,707,366

SELF-CLEANING RAKE

John H. Gartner, San Francisco, Calif.

Application October 3, 1951, Serial No. 249,513

6 Claims. (Cl. 56—400.08)

This invention relates to rakes of the type used for raking leaves, grass etc., and come under the class that are commonly called lawn rakes.

An ordinary lawn rake with which this invention is concerned, has relatively long tines of split bamboo or spring metal that are arranged like a fan. Their end portions at their divergent ends are bent substantially at right angles to one side of the plane in which the remainders of the tines are disposed to provide raking teeth. The designation "lawn rake" as hereinafter used, is intended to apply to the foregoing type of rake.

The main object of this invention is the provision of a lawn rake that is self cleaning, that is—one that automatically frees itself of the material that is being raked each time it is lifted at the end of a raking stroke or movement.

Another object of the invention is the provision of a lawn rake that is less tiring on the operator than conventional lawn rakes, when used.

An additional object of the invention is the provision of means for a conventional lawn rake that is easily secured thereto and that reinforces the tines of said rake and prevents material from jamming between the tines or being held thereby.

Heretofore conventional lawn rakes have been the most widely accepted and popular means for raking leaves, grass and accumulations of loose material from lawns, paths, etc. The tines do not injure the growing grass nor do they dig up the ground, but they are highly susceptible to clogging or jamming by leaves, grass and the like. If the operator does not frequently stop and remove the jammed material, the rake will not do a clean job, and considerable time is wasted going over the same ground several times in an attempt to clean up the loose material. If the operator stops to frequently clean the rake, there is a loss of time that might have been applied to raking. Also, even slight jamming of the tines makes the raking a harder operation.

With the present invention, the operator has a clean rake for each raking movement without the slightest additional effort on his part, and the automatic cleaning of the rake tines occurs at the end of each raking stroke, leaving the material that is removed from the rake with the material that has been raked. No time is wasted in shaking the rake, or in using the fingers to remove material or in any operation other than that now normally employed for raking only.

Other objects and advantages will appear in the description and in the drawings.

In the drawings,

Fig. 1 is a top plan view of the head of a bamboo rake, a portion only of the handle being shown, the latter being conventional.

Fig. 2 is an enlarged sectional view taken along line 2—2 of Fig. 1, the handle being omitted.

Fig. 3 is an enlarged fragmentary plan view of the preferred form of device used in the combination shown in Fig. 1 for making a self-cleaning rake with the prongs for securing it to the rake, bent over and indicated in dash lines.

Fig. 4 is an enlarged fragmentary sectional view taken along line 4—4 of Fig. 1. The prongs on the clip shown therein are indicated in dotted line before being bent and in full line after being bent.

Fig. 5 is a reduced size perspective view of one type of a metal rake.

Fig. 6 is an enlarged elevational view of Fig. 5.

In detail, the rake head of Fig. 1 comprises a plurality of elongated tines, generally designated 1, of split bamboo. These tines are arranged like a fan with their outer ends equally spaced apart, and with their inner ends together and secured by a nail 2, or by lashing or by any suitable means to the outer end portion of a handle 3. The latter may extend above or below the rake head.

The tines 1 are secured between upper and lower strips 4 at a point spaced from their inner ends, but nearer to their inner ends than to their outer ends, and the usual means for securing said tines between said strips is by lengths of wire 5 that cross the strips, and each other at their opposite outwardly facing sides at points between each adjacent pair of tines and which wires then extend between the tines, thus not only securing the strips tightly against said tines, but spacing the latter. The strips 4 extend perpendicular to a medial line bisecting the head of the rake and the handle 3 that projects over the lower side of the rake head at its outer end to the lower strip 4 of the pair, to which it is secured, is also at right angles to strips 4. The handle terminates at its outer end substantially at said strips 4, although it may project slightly beyond the latter.

Still further outwardly of the inner ends of the tines the latter are secured together in spaced relation by lengths of wire or cord 6 that extend between the tines of each adjacent pair and that cross each other at opposite sides of each tine.

The outer end portions 7 (Fig. 2) of the tines are bent to one side of the plane in which the tines are disposed and substantially right angles thereto, said end portions being of the same length with their outer ends terminating on the same plane.

The foregoing describes a conventional bamboo lawn rake. There are minor differences in such rakes, according to the manufacturer, but in each instance the same type of tines is used and the latter are held together by strips 4 or their equivalent, and by wire or the like. Usually a number of different methods are used for securing the handle to the rake head, according to whether a bamboo handle or a solid wooden handle is used, but insofar as the present invention is concerned such differences are immaterial.

In carrying out the present invention, a generally U-shaped wire having legs 9 and a central section 10 (Fig. 3) is used. The said central section extends across the rake head and above the end pairs 11 of the tines 1, and the pairs of tines between said end tines are arranged so that alternate pairs are above and below, said section 10, with said section adjacent to and parallel with the general direction of wires 6, which follow a line that is accurate and parallel with the row of teeth or end portions 7.

As already pointed out, the end pairs of tines 11 extend below the wire section 10, and as the said section is sufficiently stiff to resist distortion due to the pressure of the alternate pairs of tines that are above and below said section, it will be seen that the outer ends of the teeth 7 of the end tines and those on all tines that extend below section 10, are in one plane, while the teeth 7 on the tines that extend over the section 10 terminate in a plane that extends substantially through the base ends of the first mentioned teeth that includes those on tines 11. The degree of offset of the teeth on the tines that extend over section 10 relative to the teeth on the tines that extend below said section, is substantially equal to the length of any one of the teeth 7.

The legs 9 extend convergently relative to each other toward the convergently disposed ends of tines 1 and parallel with the end tines of the row that make up the head of the rake. At the junctures between legs 9 and the ends of section 10, said legs are preferably bent downwardly a slight distance, as at 15 (Fig. 2) so as to extend across the outermost lateral edges of the end tines.

The rear ends of legs 9 (which are the free ends nearest handle 3) are connected by a loop or eye 16 (Figs. 3, 4) to a clip preferably in the form of a clamp or clamping member 17. Each clip 17 extends over the upper side of the upper strip of the pair thereof (Fig. 4) at each end of said strip and laterally offset apertured ear 18 on each clip provides for securement of the loop 16 thereto.

Each clip preferably has prongs 19 that extend between the adjacent pairs of tines at the ends of said strips 4 and across opposite edges of said strips. These prongs are initially in the dotted line position 20 (Fig. 4) and are then bent over the lower strip 4 of the pair thereof, and toward each other, so as to tightly secure the said strips together at their ends and to also rigidly secure each clip to the ends of said strips 1. The loops 16 will constitute a hinge joint between the clips and the legs 9. It is, of course, obvious that other means may be employed for securing the section 10 between the tines of bamboo, but with the present arrangement, any person can readily secure the section 10 and its legs to a conventional bamboo lawn rake, hence invention may be an attachment for such rake, or it may be made with the rake at the time the latter is made.

The bend or elbow 15 adjacent to the ends of the central section 10 functions to prevent lateral and oppositely outward displacement of the end tines 11 in the event the wire 6 should break or become loosened, as sometimes happens. The clip 17 will hold strips 4 together should the wire 5 break or become loosened.

In operation, at the start of a raking stroke, only the alternate pairs of teeth (including end pairs of teeth 11) will engage the ground. A slight pressure downwardly on the handle will result in the remaining teeth engaging the ground. The pressure required to effect this result is less than is usually applied in a normal raking stroke. The bending of the tines is still distributed along their lengths to the handle, or strips 4 hence there is no detrimental strain placed on them.

Upon completion of the raking stroke, and when the rake head is lifted from the ground, the teeth and the outer ends of the tines will automatically spring to their positions in their offset planes and any grass, leaves, rubbish, sticks etc. that would otherwise have tended to jam between the tines or teeth, will be loosened and will fall to the ground, remaining with the material that has been raked. Thus a perfectly clean rake is provided for each raking stroke. There is no stopping to clean the tines and teeth, and a single stroke will usually suffice to clean the area coming within the width of the rake head, so there is no necessity for going over the ground because of imperfect cleaning due to material that has become jammed between tines or teeth.

Metal lawn rakes, such as indicated in Figs. 5, 6, do not usually require the device of Fig. 3 to hold the alternate pairs of teeth in the two separate planes, since with such rakes the alternate pairs of teeth can be bent along a line adjacent to the strip or plate 25 that secures the teeth together in spaced relationship, and which line is well spaced from the other ends of the tines.

In Fig. 6 the portions 26 of the tine spacing and holding means 25 usually extend between the tines and may be bent under each tine. It is to be noted, however, that with spring metal tines, the points at which the alternate pairs of tines are bent need merely be a sufficient distance from the teeth to produce the desired result.

Inasmuch as uniform bending of the tines is important, and as they are of tempered steel, the bending operation is normally performed when the rakes are made. Otherwise the device of Fig. 3 could be employed.

The offsetting of the tines so that the end pairs 11 are offset to the side toward which the teeth are bent, enables the operator to readily clean out grass or rubbish from corners or along a curb or the like, since the end teeth 11 will always be in a position to engage the ground.

While the foregoing description refers to the tines as being in alternate pairs, they may be in sets of three, or alternate tines may be offset, or combinations of single and sets of plural tines may be used. It has been found that with the conventional spacing of tines and their arrangement relative to each other, the offsetting of pairs produces the most efficient rake and a rake that is most easily operated.

When the device of Fig. 3 is used, as in the case of bamboo rakes, the hinge action between the legs and the clips prevents any resistance to the flexing of the tines by reason of the legs 9. However, the said device reinforces the rake head and, as already mentioned, prevents the tines from separating in the event the wires 6 should become broken.

It is pertinent to note that, in a bamboo lawn rake the lengths of the tines that are free to bend extend from the strips 4 to the teeth, and to obtain the most desirable results the section 10 should be at a point about midway between the ends of said lengths. The thickness of the section 10 should be such that when it is positioned at this point, the desired degree of offset between the alternate sets of teeth will be effected. This thickness in a bamboo rake is about half the length of any tooth.

The "divergent" ends of the tines in the fan shaped row are the ends that have the teeth and the "convergent" ends are the opposite ends, and in practically all conventional bamboo and steel rakes the tines are coplanar from their teeth to the place where they are secured together, as along strips 4.

The fact that the tines are secured together by the wire 6 adjacent to section 10 will secure the tines that extend over said section from bending away from the latter.

In actual practice, heretofore about half the time required for raking a given area of lawn or ground is spent in cleaning the rake and in re-passing the rake over a previously raked surface in an attempt to clear it of undesirable material, therefore the saving in time and effort with the present invention, is substantial, and the reinforcement given to the rake by this invention materially adds to its life. In certain claims the central section 10 may be designated "an elongated element" and except where expressly otherwise stated, such "element" need not be a wire nor it is intended that any other limitation attach thereto.

I claim:

1. A lawn rake having a head formed by a fan shaped row of tines having uniform length teeth extending perpendicularly from said tines to one and the same side of said row at the divergent ends of said tines, said tines being of resilient material and being arranged in two sets with the tines of said sets offset relatively at their divergent ends a uniform distance in a direction longitudinally of their teeth about equal to the length of any one of said teeth, the tines of one set being alternately arranged relative to the tines of the other set.

2. A lawn rake having a head formed by a fan shaped row of tines having uniform length teeth extending perpendicularly from said tines to one and the same side of said row at the divergent ends of said tines, said tines being of resilient material and being arranged in two sets with the tines of said sets offset relatively at their divergent ends a uniform distance in a direction longitudinally of their teeth about equal to the length of any one of said teeth, the tines of one set being alternately arranged relative to the tines of the other set, the ends of the teeth of one set being free for initial engagement with the ground upon positioning said head in raking position with the teeth directed toward the ground and the tines carrying the teeth of said one set being adapted to flex under pressure on said head toward the ground for subsequent engagement of the teeth of the other pair with the ground, the end teeth of said row being in said one set for said initial engagement with the ground.

3. A lawn rake having a head formed by a fan shaped row of tines having uniform length teeth extending perpendicularly from said tines to one and the same side of said row at the divergent ends of said tines, said tines being of resilient material and being arranged in two sets with the tines of said sets offset relatively at their divergent ends a uniform distance in a direction longitudinally of their teeth about equal to the length of any one of said teeth, the tines of one set being alternately arranged relative to the tines of the other set, an elongated element in a position extending longitudinally of said row and across oppositely facing sides of the tines of said sets respectively, and along a line spaced a substantial distance from the teeth of said sets for holding the tines of said sets in said offset relationship, and means connecting said element with the said tines for securing said element in said position.

4. A lawn rake having a head formed by a fan shaped row of tines having uniform length teeth extending perpendicularly from said tines to one and the same side of said row at the divergent ends of said tines, said tines being of resilient material and being arranged in two sets with the tines of said sets offset relatively at their divergent ends a uniform distance in a direction longitudinally of their teeth about equal to the length of any one of said teeth, the tines of one set being alternately arranged relative to the tines of the other set, an elongated element in a position extending longitudinally of said row and across oppositely facing sides of the tines of said sets respectively, and along a line spaced a substantial distance from the teeth of said sets for holding the tines of said sets in said offset relationship, and means connecting said element with the said tines for securing said element in said position, end portions on the ends of said element extending transversely across the end tines of said row in a direction transversely of said row to limit opposite outward movement of said end tines relative to each other.

5. A lawn rake having a head formed by a fan shaped row of tines having uniform length teeth extending perpendicularly from said tines to one and the same side of said row at the divergent ends of said tines, said tines being of resilient material and being arranged in two sets with the tines of said sets offset relatively at their divergent ends a uniform distance in a direction longitudinally of their teeth about equal to the length of any one of said teeth, the tines of one set being alternately arranged relative to the tines of the other set, an elongated element in a position extending longitudinally of said row and across oppositely facing sides of the tines of said sets respectively, and along a line spaced a substantial distance from the teeth of said sets for holding the tines of said sets in said offset relationship, and means connecting said element with the said tines for securing said element in said position, including a binding strip spaced from said element and adjacent to the convergent ends of said tines and secured to the latter and legs on the ends of said element extending alongside the end tines of said row to said strip and secured to the latter.

6. A lawn rake having a head formed by a fan shaped row of tines having uniform length teeth extending perpendicularly from said tines to one and the same side of said row at the divergent ends of said tines, said tines being of resilient material and being arranged in two sets with the tines of said sets offset relatively at their divergent ends a uniform distance in a direction longitudinally of their teeth about equal to the length of any one of said teeth, the tines of one set being alternately arranged relative to the tines of the other set, an elongated element in a position extending longitudinally of said row and across oppositely facing sides of the tines of said sets respectively, and along a line spaced a substantial distance from the teeth of said sets for holding the tines of said sets in said offset relationship, and means connecting said element with the said tines for securing said element in said position, including a binding strip spaced from said element and adjacent to the convergent ends of said tines and secured to the latter and legs on the ends of said element extending alongside the end tines of said row to said strip and secured to the latter, clamps on said legs in clamping relation to the ends of said strip for so securing said legs to said strip.

References Cited in the file of this patent

UNITED STATES PATENTS

| | | |
|---|---|---|
| 1,697,289 | Rocquin | Jan. 1, 1929 |
| 1,880,580 | Tokunaga | Oct. 4, 1932 |
| 2,018,311 | McGuire | Oct. 22, 1935 |
| 2,105,548 | Montan et al. | Jan. 18, 1938 |
| 2,236,129 | Baker | Mar. 25, 1941 |

FOREIGN PATENTS

| | | |
|---|---|---|
| 86,526 | Sweden | June 9, 1936 |